United States Patent [19]

Gjessing et al.

[11] Patent Number: 4,992,797
[45] Date of Patent: Feb. 12, 1991

[54] METHOD OF DETECTION AND IDENTIFICATION OF ONE OR MORE REMOTE OBJECTS

[75] Inventors: Dag K. T. Gjessing, Skedsmokorset; Jens F. Hjelmstad, Tretten, both of Norway

[73] Assignee: Norges Teknisk-Naturvitenskapelige Forskningsrad, Olso, Norway

[21] Appl. No.: 45,001
[22] PCT Filed: Jul. 29, 1985
[86] PCT No.: PCT/NO85/00046
§ 371 Date: May 21, 1987
§ 102(e) Date: May 21, 1987
[87] PCT Pub. No.: WO87/00930
PCT Pub. Date: Feb. 12, 1987

[51] Int. Cl.$^5$ ............................................. G01S 13/526
[52] U.S. Cl. .................................. 342/192; 342/190; 342/64; 342/90
[58] Field of Search .................. 342/64, 65, 190, 191, 342/192, 193, 90, 188

[56] References Cited

U.S. PATENT DOCUMENTS

| | | | |
|---|---|---|---|
| 3,716,823 | 2/1973 | Thompson et al. | 367/93 |
| 3,772,689 | 11/1973 | Root, Jr. | 342/188 |
| 3,803,598 | 4/1974 | Abernathy et al. | 342/192 |
| 3,913,099 | 10/1975 | Wehner et al. | 342/192 |
| 4,025,920 | 5/1977 | Reitboeck et al. | 342/13 |
| 4,068,234 | 1/1978 | O'Meara | 356/5 X |
| 4,144,571 | 3/1979 | Webber | 342/63 X |
| 4,151,527 | 4/1979 | Masliah et al. | 342/75 |
| 4,179,693 | 12/1979 | Evans et al. | 342/64 |
| 4,241,350 | 12/1980 | Uffelman | 342/190 |
| 4,323,898 | 4/1982 | Barnes et al. | 342/90 |
| 4,348,674 | 9/1982 | Muth et al. | 342/192 |
| 4,470,048 | 9/1984 | Short, III | 342/189 |
| 4,495,580 | 1/1985 | Keearns | 342/64 X |
| 4,514,733 | 4/1985 | Schmidtlein et al. | 342/64 |
| 4,520,445 | 5/1985 | Keearns | 342/65 X |
| 4,602,336 | 7/1986 | Brown | 342/64 X |
| 4,603,331 | 7/1986 | Wehner | 342/192 |
| 4,646,244 | 2/1987 | Bateman et al. | 364/461 |
| 4,675,823 | 6/1987 | Noland | 342/65 X |
| 4,698,635 | 10/1987 | Hilton et al. | 342/64 |
| 4,700,307 | 10/1987 | Mons et al. | 342/64 X |
| 4,727,374 | 2/1988 | Boulais | 342/50 |
| 4,849,762 | 7/1989 | Barnes | 342/188 |

OTHER PUBLICATIONS

M. Skolnit, "Radar Handbook", 1970, McGraw-Hill, s. 32-28-32-32.
"Target Identification by Means of Radar"; Microwave Journal; Dec. 1984 pp. 85-103.
"Radar-82"; International Conference; Oct. 18-20, 1982.

(List continued on next page.)

Primary Examiner—Thomas H. Tarcza
Assistant Examiner—John B. Sotomayor
Attorney, Agent, or Firm—Wenderoth, Lind & Ponack

[57] ABSTRACT

A method of identifying and detecting remote objects by transmitting wave energy and receiving wave energy reflected from the object. Separate signal parameters pertaining to the wave energy received are processed forming a measured signature of the object. The measured signature is compared with a number of prestored signatures having the same signal parameters relating to known objects of interest. A recording is made of which prestored signatures correspond to the measured signature within predetermined tolerances. Subsequent transmission and reception of wave energy is used for updating the separate parameters and the measured signature. The updated measured signature is compared with the recorded prestored signatures for updated recording of a smaller number of prestored signatures corresponding to the updated measured signature within the predetermined tolerances.

8 Claims, 10 Drawing Sheets

OTHER PUBLICATIONS

"Signal Processing Techniques for Surveillance Radar: An Overview"; Microwave Journal, Jun. 1985, pp. 133–140.

"Radar and Penetration Aid Design"; B. J. Burdick et al.; 5/78; pp. 72–77.

"Pattern Classification and Scene Analysis"; Richard O. Duda et al.; 1973; (9) pages.

"Transient Response Characteristics in Identification and Imaging"; IEEE Transactions on Antennas and Propagation, vol. AP-29, No. 2, Mar. 1981.

"Low–Frequency Approach to Target Identification"; Proceedings of the IEEE, vol. 63, No. 12, Dec. 1975.

"Aerospace and Electronic Systems"; IEEE Transactions; vol. AES-17, No. 5, Sep. 1981.

"Targent Classification with Multiple Frequency Illumination"; IEEE Transactions on Antennas and Propagation; Vol. AP-29, No 3, Mar. 1981.

"Development and Comparision of Two Target Classification Techniques for Resonance Region Radars"; J. S. Chen et al.; Apr. 1984, pp. 1–25.

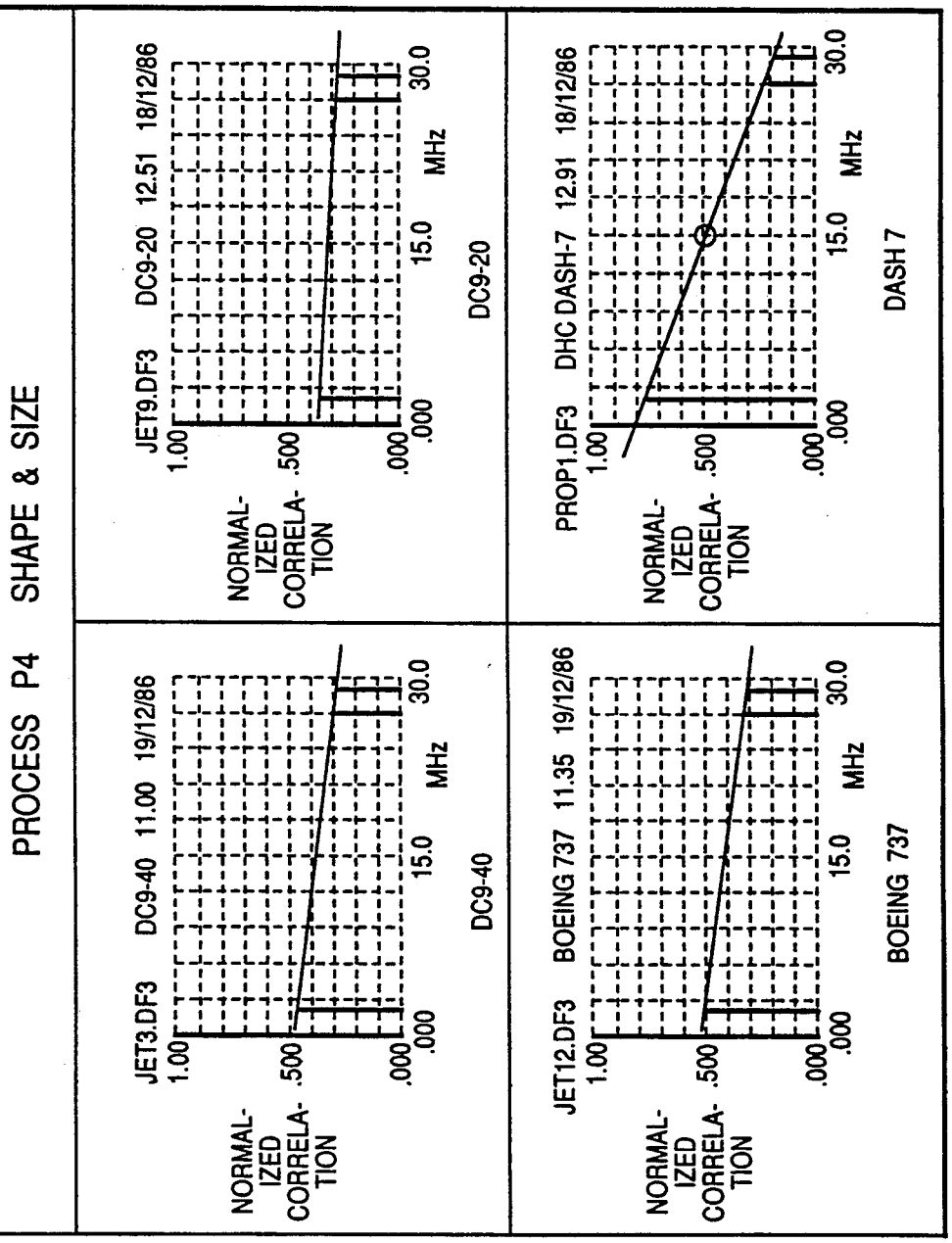
FIG. 3 PROCESS P4 SHAPE & SIZE

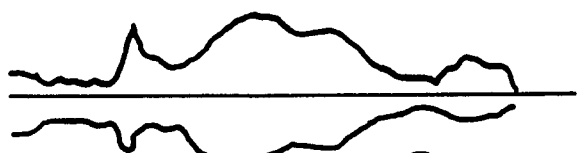
FIG. 4a
FIG. 4b
FIG. 4c
FIG. 4d
FIG. 4e
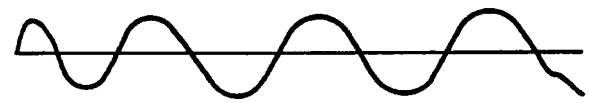
FIG. 4f
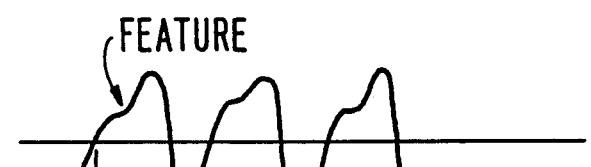
FIG. 6a
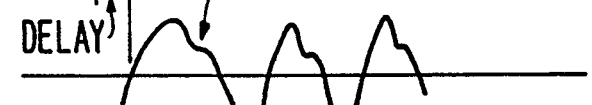
FIG. 6b
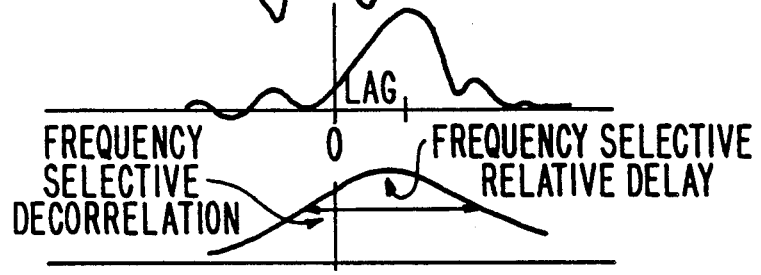
FIG. 6c
FIG. 6d
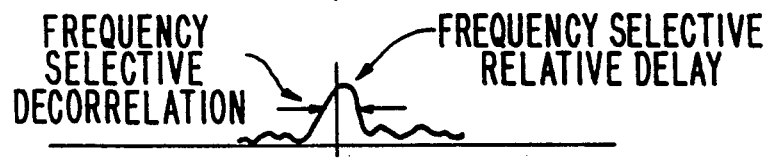
FIG. 6e

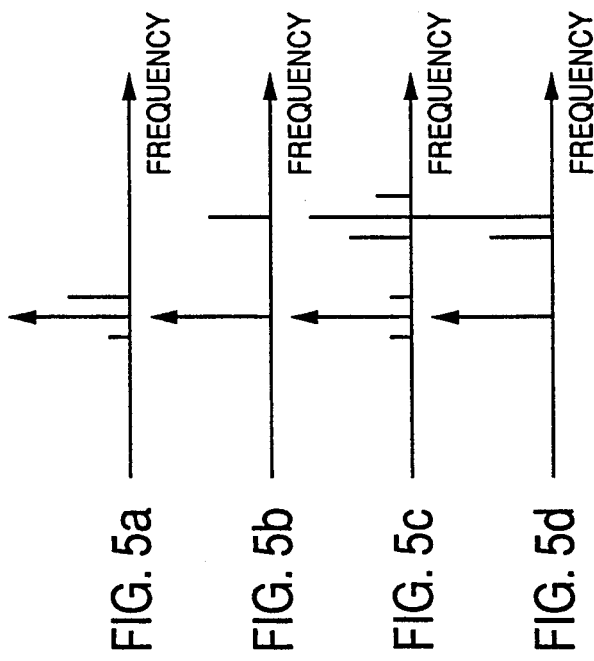
FIG. 5a
FIG. 5b
FIG. 5c
FIG. 5d
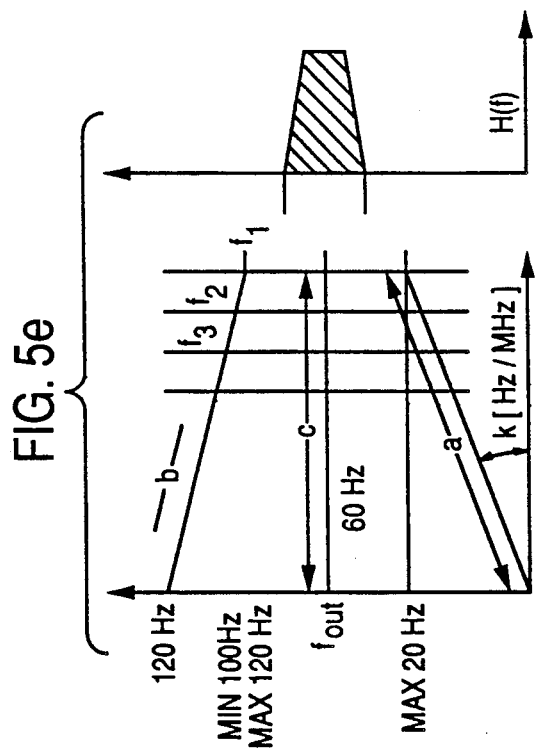
FIG. 5e

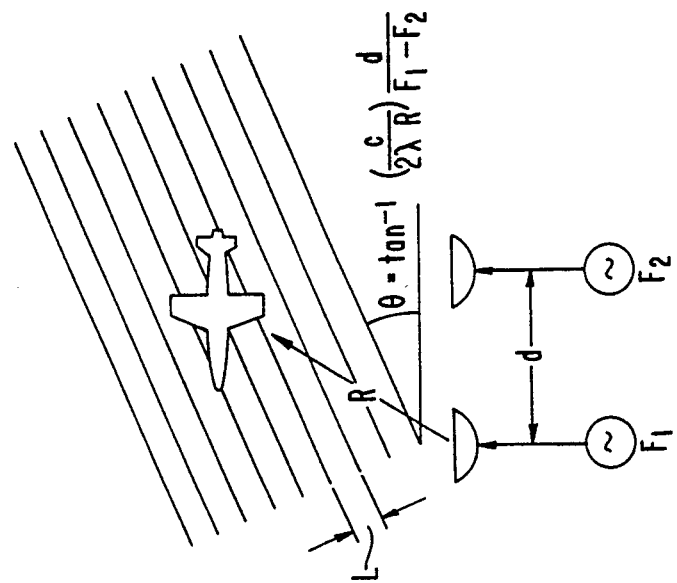
FIG. 8
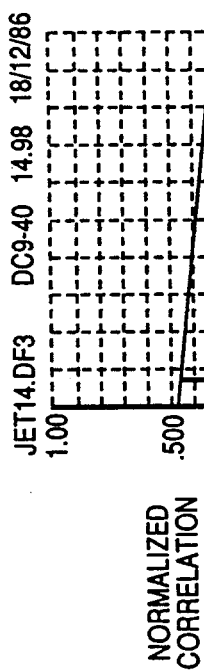
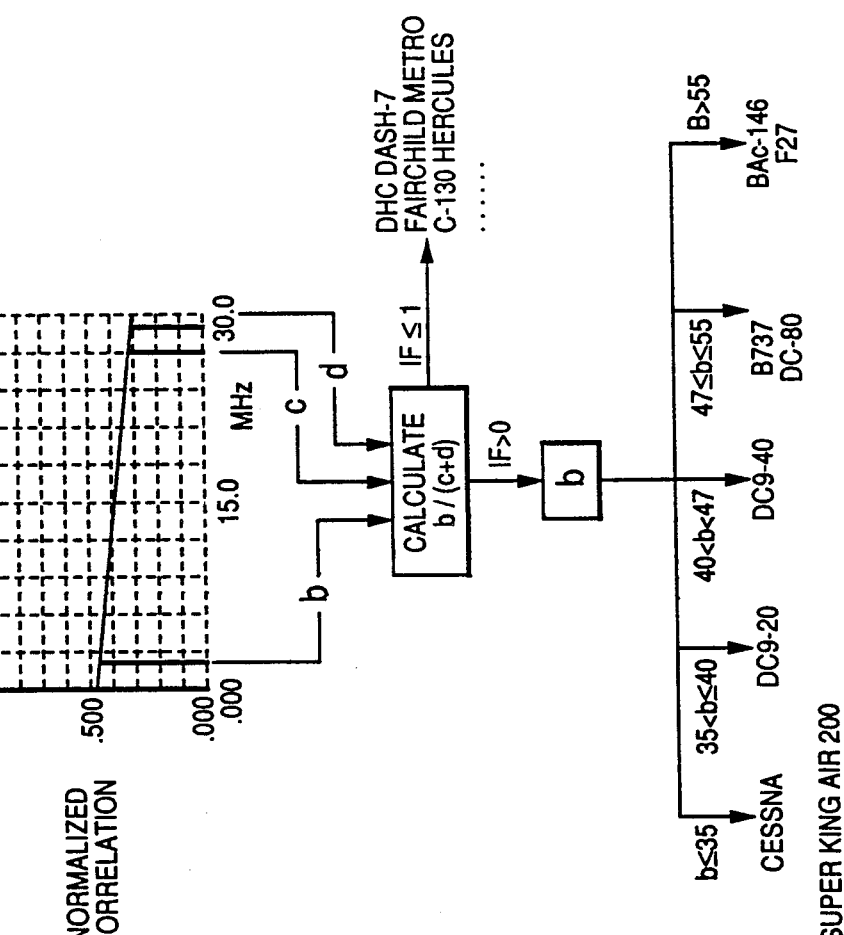
FIG. 7

METHOD OF DETECTION AND IDENTIFICATION OF ONE OR MORE REMOTE OBJECTS

BACKGROUND OF THE INVENTION

This invention is primarily directed to an improved radar for detecting and identifying remote objects or targets by means of electromagnetic wave energy. The method and principles to be described may also be applied, however, to other types of wave energy, such as ultrasonic waves in sonar systems.

As in known radar systems the present method involves the utilization of various processing techniques for extracting useful information from the return signal or waves reflected from the target.

The radar system described here provides optimum detection and identification of targets while minimizing the effect of background clutter and the impairments caused by the propagation of the electromagnetic waves through space.

This is achieved utilizing a set of new concepts for signal processing, the applicability of which is made feasible by the development of new technology for generating microwaves and in particular digital signal processing.

SUMMARY OF THE INVENTION

Thus, in a main aspect this invention relates to a method of detection and identification of one or more remote objects by transmitting wave energy towards the object and receiving wave energy reflected from the object as well as processing of information associated with the wave energy received. The following novel and specific combination of steps is characteristic to the method according to the invention (a) said processing comprises a number of separate signal parameters pertaining to the wave energy received, said parameters together forming a measured signature relating to the object, (b) the measured signature is compared with a number of prestored signatures comprising the same separate signal parameters relating to known objects being of interest to the detection and the identification, (c) there is effected a recording of which signatures among the prestored signatures which within predetermined tolerances correspond to the measured signature, (d) subsequent transmission and reception of wave energy is used for updating the separate parameters and thereby the measured signature, (e) the updated measured signature is compared with the recorded restored signatures for updated recording of a smaller number of prestored signatures which within predetermined tolerances correspond to the updated measured signature, (f) and repeating steps (d) and (e) until there remains a small number of recorded prestored signatures, preferably only one such signature, which defines a small number of objects, preferably only one such object, being of interest.

In order to obtain a number of separate signal parameters adequate for processing as stated above, it is an advantage to use a multifrequency radar signal transmission. More specifically, multifrequency polarimetric illumination of targets makes it possible to determine characteristics of target signatures. With multifrequency illumination several independent feature or signal parameter domains of the targets are revealed. In other words this involves the simultaneous use of orthogonal signatures for identification of targets or objects of interest.

Such parameters or feature domains may be the following:

i: the multifrequency response for the number of scales investigated (target down-range signature),
ii: the time variations of each scale selective (see i above) multifrequency response (vibration pattern),
iii: mutual coherence of time and space variations (target rigidity),
iv: the polarization properties of each scale (target symmetry),
v: polarimetric Doppler (target torsion).

As each of these parameter sets (domains) are independent and thus mathematically orthogonal, a multidimensional target estimation is performed.

Among the parameter domains mentioned above, the multifrequency illumination response is considered to be fundamental. In addition thereto, the polarization properties associated with possible target symmetry may be very useful.

The aspect angle of target as seen from the radar location at any instant is also an important magnitude which could to some extent be considered as one of the separate signal parameters referred to. In this context, however, the aspect angle is treated as a variable different from the types of signal parameters in the domains as listed above (i . . . v).

BRIEF DESCRIPTION OF THE DRAWINGS

FIG. 3 presents examples of signatures resulting from the process in block 21. These examples relate to some well-known airplane types.

Figure 1:
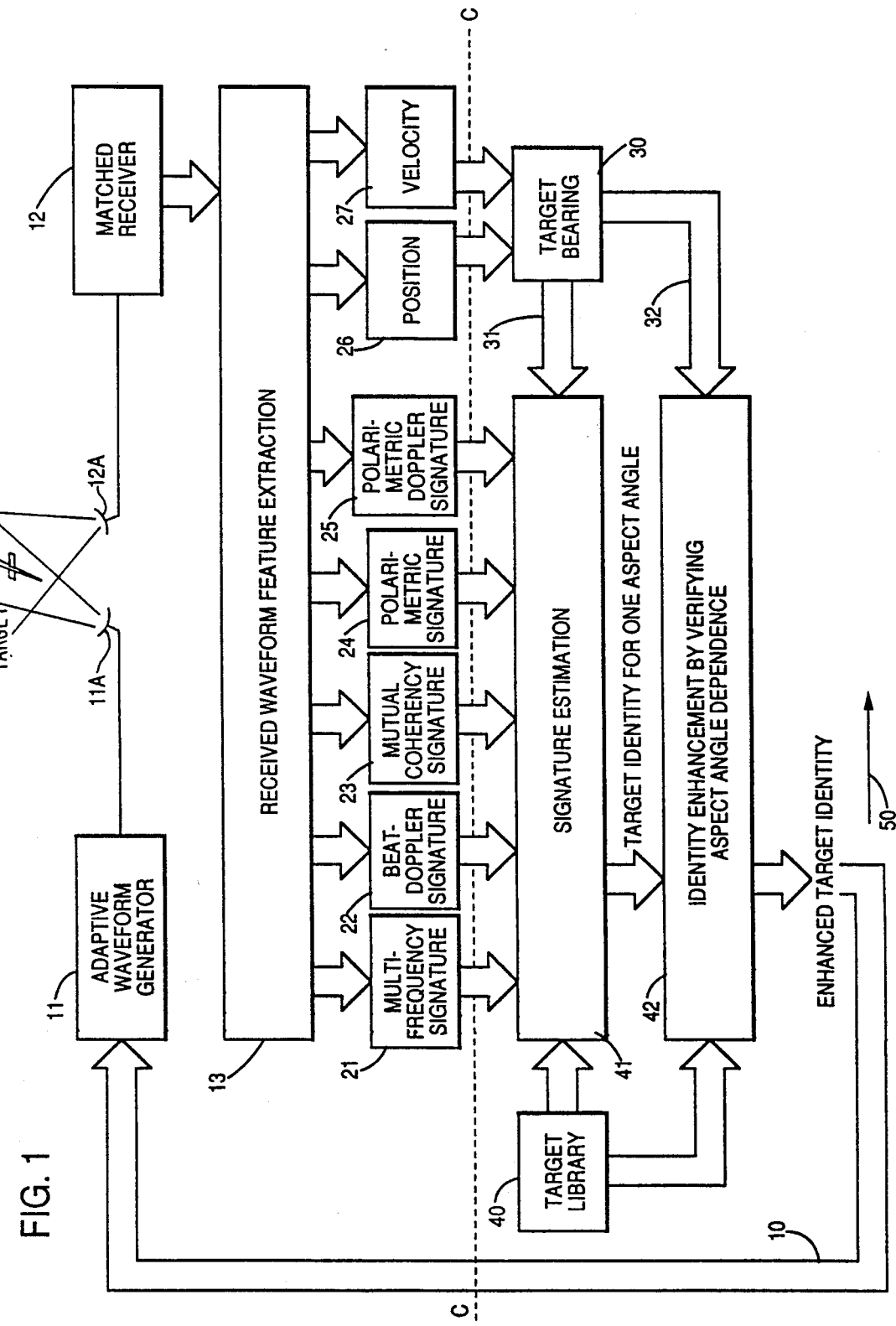
FIG. 1 is an illustration of a preferred structure of a system for carrying out the method according to this invention.

The radar system structure shown in the drawing comprises a transmitter or wave-form generator 11 feeding an antenna 11A, as well as a receiver 12 with an associated receiving antenna 12A. These components are broadband coherent microwave components. The transmitter and receiver antenna may for example be combined as a single unit. Within the antenna beams there is indicated a target T to be detected and identified.

As will be explained later the wave-form generator 11 is preferably an adaptive wave-form generator making it possible to adapt the wave-forms transmitted in accordance with information which may exist or may be gained with respect to the target or objects being out interest. Correspondingly, the receiver 12 may be a matched receiver having characteristics which may be selected to correspond to the particular wave-form or signature transmitted at any instant.

The adaptive waveform generator 11 can be realized in many ways, such as through:
  computer generation
  analog components, for example SAW devices
  standard or conventional technology.

One currently preferred practical implementation is described in detail in "MULTIFREQUENCY MODEM—TECHNICAL DESIGN PRELIMINARY SPECIFICATIONS" by Jens Hjelmstad, published by the Royal Norwegian Council for Scientific and Industrial Research.

A transmitted waveform h(t) gives a spectrum H(f). A matched receiver is defined as a receiver that has a transfer function H* (f), whereby * denotes complex conjugate.

The signals received and detected are supplied to block 13 which comprises further detection and filtering circuits operating according to generally known principles in order to extract predetermined features or signal parameters from the received wave-form. The detection here is homodyne detection, i.e. demodulation to baseband giving in-phase and quadrature channels. This is also further explained later. As shown by blocks 21, 22, 23, 24 and 25 these features may consist of the following parameter domains:
21—Multifrequency signature
22—Beat Doppler signature
23—Mutual coherency signature
24—Polarimetric signature
25—Polarimetric Doppler signature.

As will be understood, these blocks 21-25 correspond to the respective items i-v listed above.

Both analog and digital signal processing may be involved in blocks 13 and 21-25, and in any case the output signals from blocks 21-25 are in a digital form. There is a horizontal dashed line C—C shown in the drawing, to indicate that the functions or blocks found below that line are performed in a suitable computer. It is to be understood that there is no strict boundary between the more or less conventional signal processing blocks and circuits described above and the computerized functions to be explained in the following. Thus, line C—C serves to indicate that there is at a certain level of signal processing relating to the various parameters or domains involved, a stage where the processing is substantially taken over by the computer in a purely digital form.

A main block or function which is typically computerized is block 40 which is a store or target library containing known signal parameters in one or more feature domains pertaining to all the targets or objects being of interest for the system concerned. These may for example be objects in the form of several types of passenger aircraft which normally operate on a given airport. The complete set of signal parameters pertaining to a certain aircraft may be stored in block 40 for a number of different aspect angles of such aircraft as seen from antennas 11A and 12A. Depending upon the number of signal parameters employed, the number of different aircraft to be covered and the number of aspect angles being relevant, the required storage capacity in library block 40 may be very high.

Figure 2:
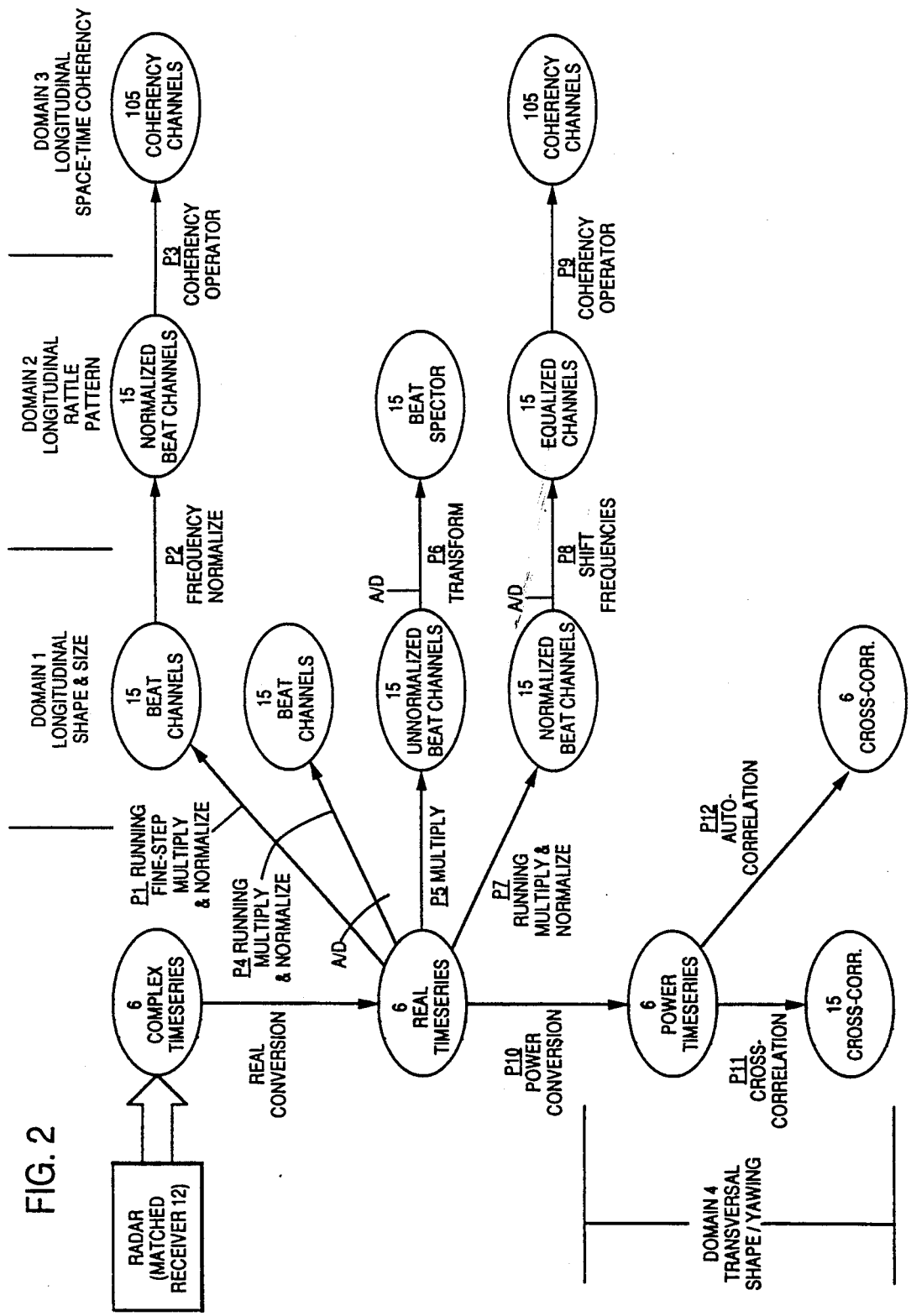
FIG. 2 gives an overview of essential parts of the processes involved. The signals processed are obtained from the matched receiver 12 as found in the original figure of drawing in this application. At certain points in FIG. 2 there is indicated (A/D) analog to digital conversion, corresponding more or less to line C—C in FIG. 1. The processes illustrated in FIG. 2 are essentially those performed in blocks 21, 22 and 24 in FIG. 1.
Figure 4G:
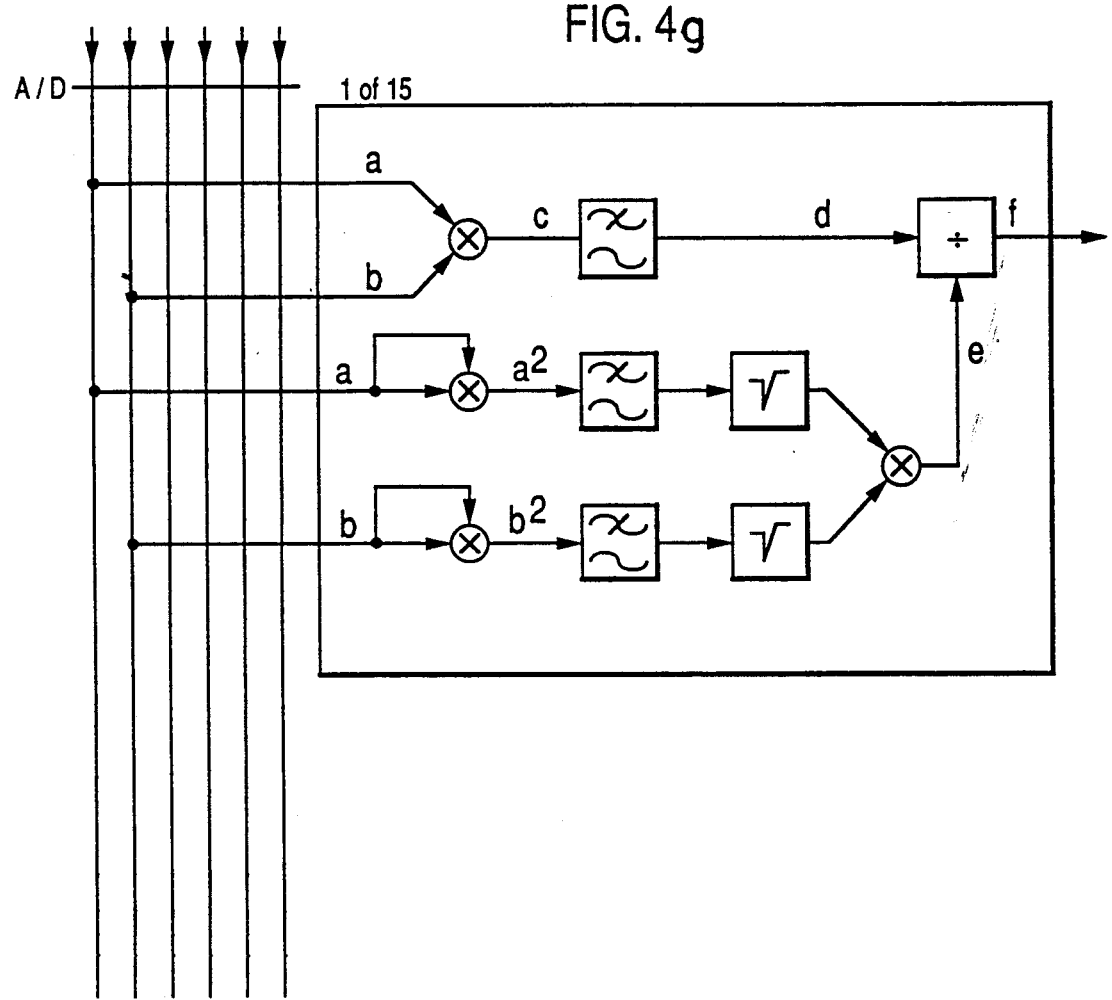
FIG. 4 illustrates somewhat more in detail the process of estimation of multifrequency signature according to block 21 (and in part block 41). This is process P1 as indicated in FIG. 2 above.
Figure 5F:
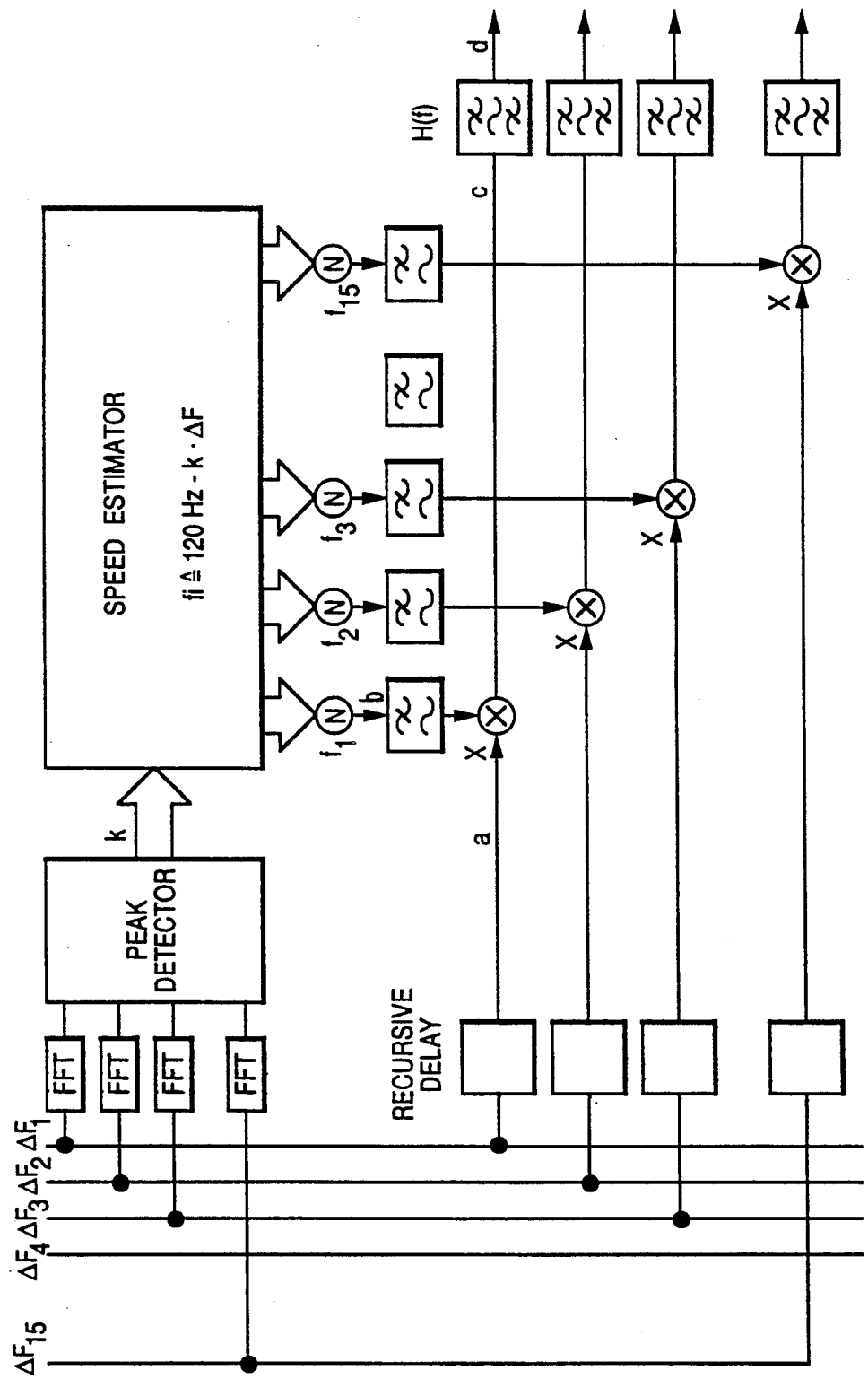
FIGS. 5 and 6 show how the mutual coherence signatures are obtained, illustrating more in detail the processing in block 24 as well as processes P2 and P3 in FIG. 2 above. It is to be noted, inter alia, that the Fast Fourier Transform (FFT) is performed at several points in FIGS. 5 and 6.
Figure 6F:
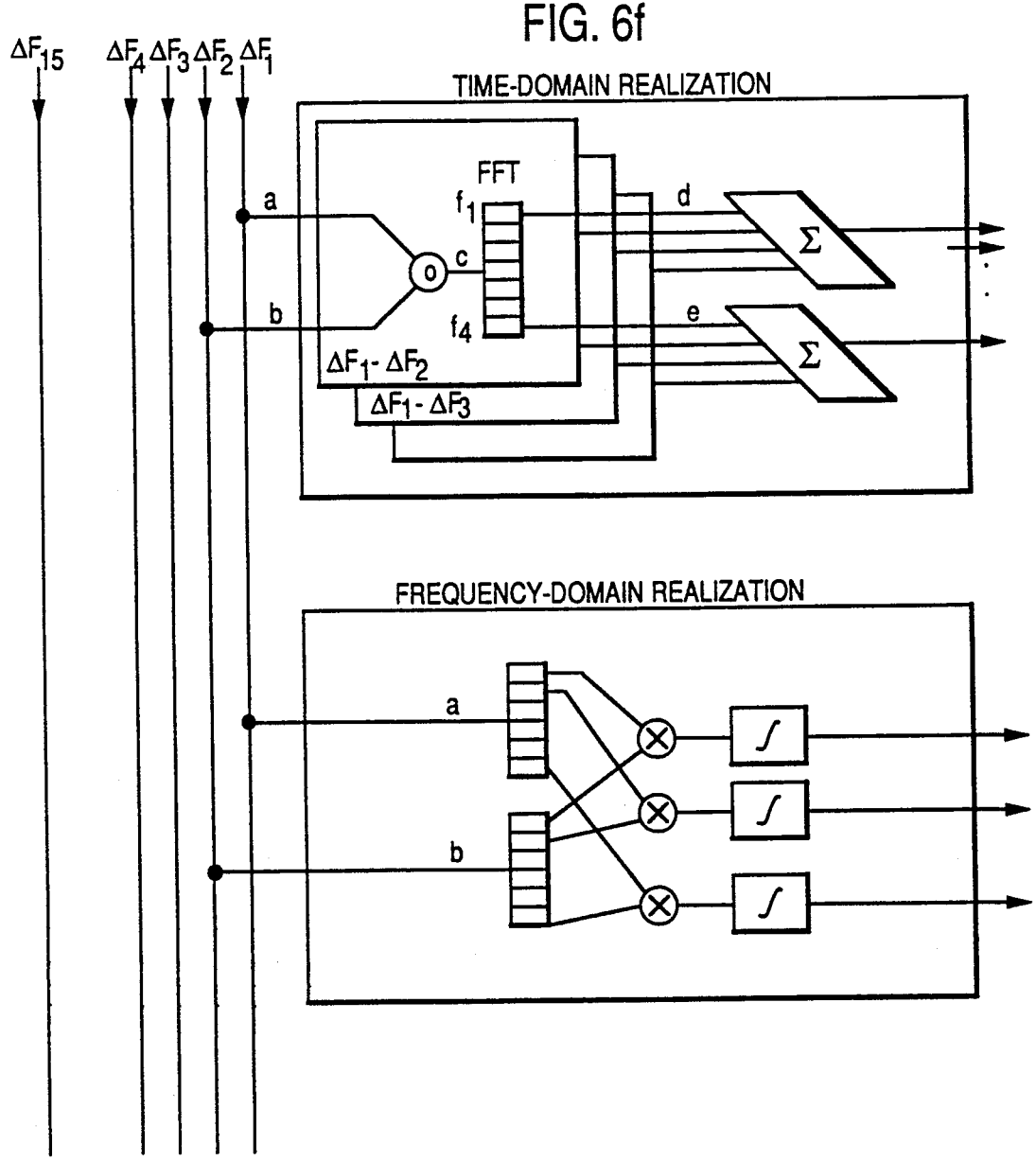

In block 41 designated signature estimation there is essentially performed a comparison between an actually measured signature consisting of parameter sets furnished by blocks 21-25 for each transmission and accompanying reception of illuminating electromagnetic wave energy directed towards the target. Such measured signature is then compared initially with all the prestored signatures found in library block 40 in order to determine whether one or more of such prestored signatures correspond to the measured signature within predetermined tolerances. Thus, by cross-referring to the library in this manner, the target identity is estimated for each of the features or signal parameters involved. FIG. 7 shows an example of an algorithm for signature estimation. This corresponds to process P4 in FIG. 2 and a number of well-known airplane types are referred to in FIG. 7.

A report number TN 80/86—"Recognition algorithms for adaptive radar" by the inventor, Hens Hjelmstad, and others, gives an overview of known available methods for use in identifying targets based on comparison with signatures contained in a library, such as target library 40 in the original drawing. All the alternative methods described in the report may be of interest in connection with the present invention. The most probable target identify may be obtained by weighting the vote of each feature by a feature significance factor.

At this point reference is made to blocks 26 and 27 which relate to information extracted with respect to position and velocity of the target. This is information being per se fundamental in almost all earlier and conventional radar systems. According to the present invention such information from blocks 26 and 27 is processed further in target bearing block 30 so as to determine or estimate the aspect angle of the target. By using a pair of antennas as shown in FIG. 8, the instantaneous bearing of an aircraft is measured. This can be done in both the vertical and the horizontal planes. The bearing is calculated on the basis of a determination of the direction of the phase front, which in turn is given by the antenna spacing (d) and the frequency spacing (F1-F2) and by measuring the rate at which the aircraft passes through these phase fronts. Two phase fronts are needed at different angles. The term aspect angle as used here, in fact comprises three angles which together define the direction of the longitudinal axis of a target in space.

As already mentioned above, such target aspect angle may be introduced in block 41 together with aspect angle information obtained from library block 40, thereby increasing the possible amount of detail with which a target may be identified. Thus, in a particular embodiment of this invention, having specific advantages, the comparison of a measured signature with prestored signatures is limited to prestored signatures pertaining to the aspect angle concerned, as delivered from target bearing block 30 through connection 31.

Thus, when estimation of target identity is completed, the target by its own movement will cause the measured features or signature to change if the movement is such that the aspect angle of the target changes. This function of identity enhancement by verifying aspect angle dependence is performed in block 42 which on the one hand receives data from library block 40 and on the other hand receives aspect angle data from block 30 through connection 32. Since the target signature as measured will change in a deterministic manner as the aspect angle changes, this results in an improved identification of the target, based upon prestored data with respect to the target concerned, for a range or number of aspect angles. If the signature measured follows the expected changes, the probability of correct identification is increased.

In connection with the above, tracking information may be used to provide an initial knowledge of the target aspect angle for search in the prestored signature library 40. By tracking the target over some distance, the true bearing and velocity of the target can be established. These data are used to provide the aspect angle for the target identity estimation, thereby reducing the search time and increasing the probability of correct identification.

The output from block 42 may be considered as the final product of the processing method performed by the system described. Thus, arrow 50 indicates some form of display to be presented to an operator or the like. The output from block 42 may, however, as indicated at 10, be fed back to the adaptive wave-form generator 11 so as to effect possible adjustments of the wave-form signature to be transmitted therefrom.

The display represented by arrow 50 may be a cathode ray tube screen arranged for a presentation of the PPI type, indicating for example a map or contours of the field surveyed, targets detected in this field, a listing showing the number of targets and their types, the sectors in which the respective targets are positioned, etc.

Figure 9:
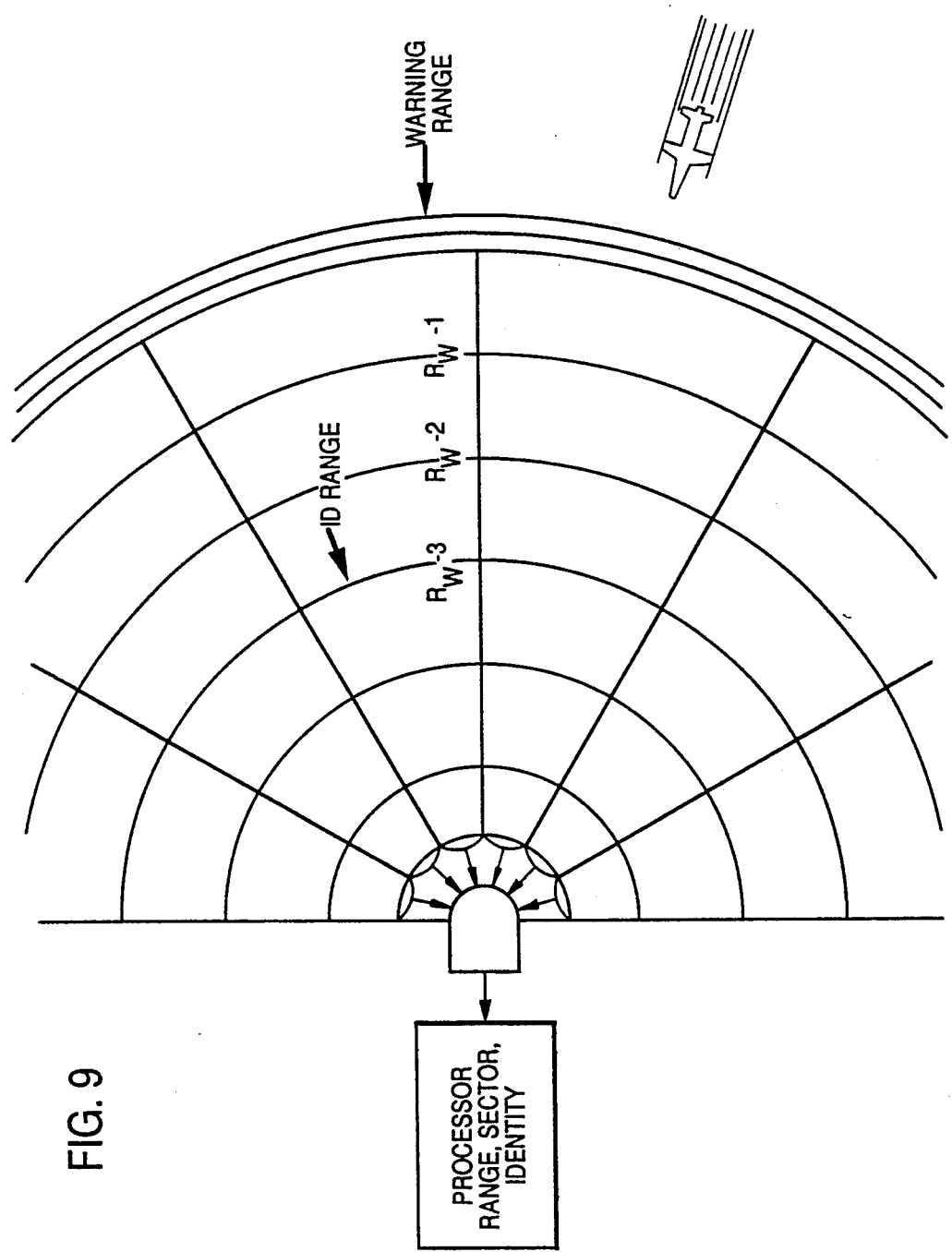

FIG. 9 shows an example of a possible practical form of display based on a cathode ray tube. There is shown an aircraft symbol approaching a warning range with successive more close ranges (RW1, RW2, RW3) indicated. The last of these is designated "ID range", i.e. a range at which an aircraft has to be identified for the purpose of possible action with respect thereto.

From the structure and functions described with reference to the system in the drawing, it appears that the radar operates in a number of modes. It has a detection mode, a tracking mode and an identification mode. In the detection and tracking mode, enhanced sensitivity can be achieved using the matched illumination technique. This is accomplished by transmitting a waveform with a spectrum which is the complex conjugate of the transfer function of the expected target for the assumed look angle. This process of transmitting the complex conjugate waveform is repeated to ensure that the appropriate waveform for the given target at the given look angle is transmitted.

After the target is detected, located and its course determined, the identification process is started. The time required for an identification will depend on the number of parameters required. Some features, such as scale selection vibration pattern, requires an integration time whereby the target will move a distance equal to a few times its own length. During identification, the target is illuminated with a coherent comb of frequencies. The maximal frequency separation gives the minimum scale size investigated, and the minimum frequency separation determines the largest scale, which will correspond to the size of the largest target expected. The coherency of this waveform is such that the relative phase jitter between any two frequencies after a delay corresponding to the maximum distance to the target, is less than a fraction of a wave period.

Upon reception, the in-phase and quadrature components of each frequency line is detected in a homodyne detection circuit. The bandwidth of this circuit is equivalent to the maximum Doppler shift expected. For the chosen integration time, the RMS power (variance) of the return on each frequency line is determined. Using complex multiplication, returns are combined in pairs to give the scale selective return, the scale corresponding to the frequency separation of the two frequency components combined.

The amplitude of these products, normalized with the amplitude of each of the two frequency lines gives the multifrequency response (signature).

Through spectral analysis of the time series associated with each of the scale returns, the beat Doppler signature is calculated. This gives the scale selective vibration pattern. For targets like aircraft the Doppler shift will be proportional to the frequency separation and the speed of the target, whereas for clutter like the sea surface, the Doppler shift will be a function of the square root of the frequency separation only.

The mutual coherency filter gives the rigidity of the target through time-space coherency filtering.

By using two separate transmitting and receiving channels, the polarization signature of each scale is provided in the form of a scattering matrix.

The polarimetric Doppler signature reveals the time variations of the symmetry properties of the target as it moves. This signature is revealed using spectral analysis of each individual element of the scattering matrix and also correlation between the three independent elements of the scattering matrix.

The complete set of identification parameters is obtained over the integration period wherein the radar is illuminating the target. This integration period might in the case of a pulsed radar or angular scanning radar be interrupted, provided the sampling frequency is high enough to reveal the vibrations of the target.

Thus, in subsequent transmission and reception of electromagnetic wave energy the separate parameters and thereby the measured signature are updated. The updated measured signature is compared with the previously recorded prestored signatures having resulted from the previous transmission/reception cycle, for updated recording of a smaller number of prestored signatures which within predetermined tolerances correspond to the updated measured signature.

The process whereby the measured signature is compared with the prestored signature can be any of the methods described in estimation theory. In the first approximation, an estimate of the look angle of the target (being unknown at this point), is calculated so that only the set of signatures for this look angle for all the targets in the target library is used.

By repeating these cycles or method steps in analogy with the principles of successive approximations, there will finally remain a very small number of possible targets, and preferably only one and the correct target being identified with a high degree of certainty.

In the process of selecting the one target, only the set of possible targets selected in the previous iteration is further investigated. Furthermore, for each updated signature a new updated estimation of the look angle is calculated, so that the reference signature for the possible target investigated in the new iteration is the signature corresponding to the new look angle of the target. Through the coupling of the aspect angle information and signature measurements increased probability of correct identification is accomplished.

Experts in this field will understand that the method described here may be introduced in existing coherent radar installations by having these retrofitted with the required signal processing and identification means.

We claim:

1. Method of detection and identification of one or more remote objects by transmitting wave energy towards the object and receiving wave energy reflected from the object as well as processing of information associated with the wave energy received, wherein said processing comprises a number of separate signal parameters pertaining to the wave energy received, said parameters together forming a measured signature relating to the object, and the measured signature is compared with a number of prestored signatures comprising the same separate signal parameters relating to known objects being of interest to the detection and the identification, characterized in that (A) said separate signal parameters are selected to relate to a number of independent observation domains, (B) there is effected a recording of those signatures among the prestored signatures which within predetermined tolerances correspond to the measured signature, (C) subsequent transmission and reception of wave energy is used for updating the separate parameters and thereby the measured signature, (D) the updated measured signature is compared with the recorded restored signatures for updated recording of a smaller number of prestored signatures which within predetermined tolerances correspond to the updated measured signature, (E) and steps (C) and (D) are repeated until there remains a small number of recorded prestored signatures, preferably only one such signature, which defines a small number of objects, preferably only one such object, being of interest.

2. A method according to claim 1, characterized in that the separate signal parameters comprise the multifrequency response of the object obtained by transmitting a number of coherent signal frequencies.

3. A method according to claim 2, characterized in that the separate signal parameters comprise the Doppler response of the object for each individual multifrequency component.

4. A method according to claim 3, characterized in that the separate signal parameters comprise the mutual time coherency between the multifrequency response and the Doppler response.

5. A method according to claim 1, characterized in that the separate signal parameters comprise the polarization response of the object and preferably also the polarization Doppler response of the object obtained by transmitting wave energy having two orthogonal polarization directions and being so coded that the resulting contribution in each of two corresponding receiver polarization channels can be separated into co-polarized and cross-polarized components which constitute the polarization response and the polarization Doppler response, respectively.

6. A method according to claim 4, characterized in that the prestored signatures relate to a number of different aspect angles for each of the known objects being of interest and that for each transmission, reception and measured signature the aspect angle in which the object is seen, is determined.

7. A method according to claim 6, characterized in that the comparison of the measured signature with prestored signatures is limited to prestored signatures pertaining to the actual aspect angle being determined.

8. A method according to claim 1 wherein the transmitted wave energy is adapted to the objects being of interest, characterized in that the prestored signatures pertaining to the successively recorded objects, are taken as a basis for successively corresponding adaption of the transmitted wave energy.

* * * * *